United States Patent
Liu et al.

(10) Patent No.: US 12,372,303 B1
(45) Date of Patent: Jul. 29, 2025

(54) STATUS MONITORING SYSTEM AND CONTROL METHOD FOR MESH BELT FURNACE FOR CERAMIC SINTERING

(71) Applicant: JANGSU QIANJIN FURNACE INDUSTRYEQUIPMENT CO., LTD., Yixing (CN)

(72) Inventors: Jun Liu, Yixing (CN); Guojun Wu, Yixing (CN); Zhi Ye, Yixing (CN)

(73) Assignee: JIANGSU QIANJIN FURNACE INDUSTRYEQUIPMENT CO., LTD., Yixing (CN)

( * ) Notice: Subject to any disclaimer, the term of this patent is extended or adjusted under 35 U.S.C. 154(b) by 0 days.

(21) Appl. No.: 19/077,039

(22) Filed: Mar. 11, 2025

Related U.S. Application Data (63) Continuation of application No. PCT/CN2025/074566, filed on Jan. 24, 2025.

(30) Foreign Application Priority Data

Apr. 23, 2024 (CN) .......................... 202410487902.6

(51) Int. Cl.
*F27B 9/40* (2006.01)
*F27B 9/12* (2006.01)
(Continued)

(52) U.S. Cl.
CPC ............... *F27B 9/243* (2013.01); *F27B 9/12* (2013.01); *F27B 9/40* (2013.01); *F27D 19/00* (2013.01); *F27D 21/02* (2013.01); *G06T 7/0004* (2013.01); *G06T 7/11* (2017.01); *G06T 7/162* (2017.01); *G06T 7/194* (2017.01); *G06T 7/73* (2017.01); *G06T 7/90* (2017.01);
(Continued)

(58) Field of Classification Search
CPC .... F27B 9/243; F27B 9/12; F27B 9/40; F27B 2009/122; F27B 2009/124; F27D 19/00; F27D 21/02; F27D 2019/0003; F27D 2021/026; G06T 7/0004; G06T 7/11; G06T 7/162; G06T 7/194; G06T 7/73; G06T 7/90; F27M 2003/04
See application file for complete search history.

(56) References Cited

FOREIGN PATENT DOCUMENTS

| CN | 106017076 A | 10/2016 |
|----|-------------|---------|
| CN | 206504611 U | 9/2017 |

(Continued)

*Primary Examiner* — Yuhui R Pan
(74) *Attorney, Agent, or Firm* — Rondaus PLLC; George Liu (57) ABSTRACT

The present disclosure relates to a status monitoring system and control method for a mesh belt furnace for ceramic sintering. The system includes an acquisition layer, an analysis layer and a regulation and control layer. Image data of products conveyed in the mesh belt furnace is acquired by the acquisition layer, and acquired product image data is further segmented to obtain product images. The analysis layer synchronously receives the product images obtained by segmentation in the acquisition layer, and analyzes a product sintering status corresponding to each group of product images based on the product images. Image data acquisition on sintered products in the mesh belt furnace allows primary data to be provided for monitoring an operation status of the mesh belt furnace; then analysis based on the acquired product image data allows to determine qualification of output products in the mesh belt furnace and evaluate overall quality thereof.

9 Claims, 3 Drawing Sheets

(51) Int. Cl.
*F27B 9/24* (2006.01)
*F27D 19/00* (2006.01)
*F27D 21/02* (2006.01)
*G06T 7/00* (2017.01)
*G06T 7/11* (2017.01)
*G06T 7/162* (2017.01)
*G06T 7/194* (2017.01)
*G06T 7/73* (2017.01)
*G06T 7/90* (2017.01)

(52) U.S. Cl.
CPC ... *F27B 2009/122* (2013.01); *F27B 2009/124* (2013.01); *F27D 2019/0003* (2013.01); *F27D 2021/026* (2013.01); *F27M 2003/04* (2013.01)

(56) References Cited

FOREIGN PATENT DOCUMENTS

| | | |
|---|---|---|
| JP | 2013064540 A | 4/2013 |
| KR | 1020170029043 A | 3/2017 |

STATUS MONITORING SYSTEM AND CONTROL METHOD FOR MESH BELT FURNACE FOR CERAMIC SINTERING

CROSS-REFERENCE TO RELATED APPLICATIONS

This application is a continuation of International Application No. PCT/CN2025/074566, filed on Jan. 24, 2025, which claims priority to Chinese Patent Application No. 202410487902.6, filed on Apr. 23, 2024. All of the aforementioned applications are incorporated herein by reference in their entireties.

TECHNICAL FIELD

The present disclosure relates to the technical field of mesh belt furnaces, and specifically relates to a status monitoring system and control method for a mesh belt furnace for ceramic sintering.

BACKGROUND

The mesh belt furnace system comprises three parts: a furnace body, a mesh belt drive system and a temperature control system. The furnace body is composed of a feeding section, a pre-sintering section, a sintering section, a slow cooling section, a water cooling section, and a discharging section. The mesh belt drive system is composed of a high-temperature-resistant mesh belt, a drive device etc. A running speed of the mesh belt is adjusted by a frequency converter, which is equipped with a digital-display mesh belt speed measuring device. The speed of the mesh belt can be read directly. The temperature control system is composed of thermocouples, a digital-display intelligent PID regulator, and a silicon-controlled rectifier, forming a closed-loop control system, which enables automatic and precise temperature control.

Currently, when a mesh belt furnace is used for production of metal-ceramic products, the control of the mesh belt furnace is often based on a pre-set operating program to heat and sinter products. During this process, due to a high temperature in the environment, the products in a sintering state inside the furnace cannot be observed manually. As a result, the quality of the output products in the mesh belt furnace cannot be accurately determined based on appearance. Therefore, operation status defects of the mesh belt furnace are usually only noticed when obvious defective products appear, leading to poor quality of the output products in the mesh belt furnace and serious operational defects and failures in the mesh belt furnace.

SUMMARY

In view of the above drawbacks existing in the prior art, the present disclosure provides a status monitoring system and control method for a mesh belt furnace for ceramic sintering, which solves the technical problems mentioned in the above background.

To achieve the above objective, the present disclosure adopts the following technical solutions.

In a first aspect, a status monitoring system for a mesh belt furnace for ceramic sintering includes an acquisition layer, an analysis layer and a regulation and control layer;

image data of products conveyed in the mesh belt furnace is acquired by the acquisition layer, and acquired product image data is further segmented to obtain product images; and the analysis layer synchronously receives the product images obtained by segmentation in the acquisition layer, analyzes a product sintering status corresponding to each group of product images based on the product images, and applies the analyzed product sintering status corresponding to each group of product images, to identify a product corresponding to product images with unqualified sintering, and further obtain a corresponding position of the product corresponding to the product images with unqualified sintering in the mesh belt furnace;

the regulation and control layer receives an analysis result of the product sintering status corresponding to each group of product images from the analysis layer and the corresponding position of the product corresponding to the product images with unqualified sintering in the mesh belt furnace, evaluates overall quality of currently output products in the mesh belt furnace based on the analysis result, and performs regulation and control on the mesh belt furnace based on the received position in the mesh belt furnace;

the analysis layer includes an analysis device, an identification device and a positioning device, wherein the analysis device is configured to receive the product images obtained in the acquisition layer, and analyze product sintering statuses based on the product images; the identification device is configured to acquire an analysis result of the product sintering statuses from the analysis device, and identify an unqualified sintered product and product images corresponding thereto based on the analysis result of the product sintering statuses; and the positioning device is configured to receive the unqualified sintered product and the product images corresponding thereto identified by the identification device, and apply the product images corresponding to the unqualified sintered product to localize the product;

analysis logic of a product sintering status in the analysis device is expressed as:

$$\begin{cases} k = \left(1 - \overline{\sum_{v=1}^{u} \text{sim}(\alpha_v, \alpha_{center})}\right) \times \sum_{v=1}^{u}\sum_{q=1}^{v} |T_q - T_{center}| & (1) \\ T_{center} \in (T_{MIN}, T_{MAX}) & (2) \end{cases}$$

where k is a product sintering status performance value; u represents a product image; sim $(a_v, a_{center})$ is a similarity based on a color aspect between the vth group of sub-images of the product image and a center region of the product image; $T_q$ is a corresponding value of the qth pixel in the vth group of sub-images of the product image, in a temperature mapping table; $T_{center}$ is a corresponding value of a center pixel in the vth group of sub-images of the product image, in the temperature mapping table; and $(T_{MIN}, T_{MAX})$ is a threshold composed of maximum and minimum values of a temperature required for ceramic sintering, wherein a smaller product sintering status performance value k indicates a better product sintering status, and vice versa, a larger product sintering status performance value k indicates a worse product sintering status; the temperature mapping table is set based on colors presented by sintered ceramic at different temperature states during a historical ceramic sintering process in the mesh belt furnace; sub-images of the product image are obtained by segmentation of the product image, resulting in no fewer than nine groups of sub-images of the product image, with the size of each group of sub-images of the product image being equal; and $$\sum_{v=1}^{u} \text{sim}(\alpha_v, \alpha_{center})$$

represents averaging of $$\sum_{v=1}^{u} \text{sim}(\alpha_v, \alpha_{center}).$$

Further, the acquisition layer includes a camera device, a segmentation device and a storage device; the camera device is configured to acquire the image data of the products conveyed in the mesh belt furnace; the segmentation device is configured to receive the image data of the products acquired by the camera device and perform segmentation on the image data of the products to extract all product images in the image data of the products; and the storage device is configured to receive the product images extracted by segmentation by the segmentation device and store the product images;

wherein the mesh belt furnace is composed of a conveying station and a processing station; the conveying station is configured to convey products to the processing station so that the products are processed by the processing station; the processing station is composed of a pre-sintering zone, a sintering zone and a cooling zone, wherein the pre-sintering zone and the sintering zone are configured to provide a temperature for sintering the products, and the cooling zone is configured to cool the sintered products; the camera device is deployed in the sintering zone in the processing station; the conveying station in the mesh belt furnace conveys the products at a uniform speed, so that the products pass through the pre-sintering zone, the sintering zone and the cooling zone in the processing station successively; and the camera device operates continuously to acquire the image data of the products based on times when the products conveyed by the conveying station arrive at the sintering zone in the processing station.

Further, each time before the products are conveyed by the conveying station of the mesh belt furnace, groups of products are placed at specified positions on a surface of the conveying station of the mesh belt furnace in such a manner that the groups of products are arranged in the same pose, and horizontal and longitudinal distances between the groups of products are equal; when the camera device acquires the product image data, a boundary of the conveying station of the mesh belt furnace is used as an image data acquisition boundary, so that foregrounds in the acquired product image data are entirely products and backgrounds therein are entirely the surface of the conveying station; and when receiving the product image data and segmenting the product image data to extract all product images in the product image data, the segmentation device first determines product image coordinates in the product image data so that closed graphs are formed based on the product image coordinates, and performs segmentation in the product image data by using the closed graphs to obtain image regions corresponding to the closed graphs.

Further, logic for determining the product image coordinates in the product image data is expressed as:

$$\begin{cases} x/x_0 = m/m_0 & (1) \\ y/y_0 = n/n_0 & (2) \end{cases},$$

where (x,y) is any set of coordinates adjacent to a product on a conveying surface boundary of the conveying station of the mesh belt furnace; $(x_0,y_0)$ is any set of coordinates on a contour of a contact surface between the product conveyed on the conveying station of the mesh belt furnace and the conveying station; (m,n) is any set of coordinates on a long side of a contour of the product image data; and $(m_0,n_0)$ is product image coordinates, wherein (x,y) and $(x_0,y_0)$ use the same coordinate ratio, and horizontal and vertical coordinates of (x,y) and $(x_0,y_0)$ are greater than zero; (m,n) and $(m_0,n_0)$ use the same coordinate ratio, and horizontal and vertical coordinates of (m,n) and $(m_0,n_0)$ are greater than zero; (x,y) is selected in such a way that (x,y) falls on a long edge of the conveying surface of the conveying station, and a corresponding position of (x,y) is in the product image data; and a slope of (x,y) relative to $(x_0,y_0)$ is equal to a slope of (m,n) relative to $(m_0,n_0)$.

Further, $(x_0,y_0)$ applied in the logic for determining the product image coordinates represents all corner points on the contour, and a number of groups of closed graphs are obtained by interconnecting adjacent coordinates of all product image coordinates in the product image data, and image regions corresponding to the groups of closed graphs are product images.

Further, sub-images in each group of product images correspond to a group of $T_{center}$, and if all $T_{center}$ satisfies formula (2) and the product sintering status performance value k is smaller than 1, the product corresponding to the product graphs is determined to be qualified; otherwise, the product is determined to be unqualified; and after receiving the unqualified sintered product and the product images corresponding thereto, the positioning device further acquires closed graphs corresponding to the product images, and then using position coordinates corresponding to the closed graphs, reversely acquires $(x_0,y_0)$ corresponding to the position coordinates corresponding to the closed graphs based on the logic for determining the product image coordinates, and determines an unqualified sintered product based on $(x_0,y_0)$.

Further, the regulation and control layer includes an evaluation device and a regulation and control device; the evaluation device is configured to receive the unqualified sintered product localized by the analysis layer, and evaluate the overall quality of the output products in the mesh belt furnace, based on the unqualified sintered product; and the regulation and control device is configured to acquire position information of the product images corresponding to the unqualified sintered product, and perform temperature regulation and control on sintering equipment in a region corresponding to the position information of the product images, in a sintering station of a processing station of the mesh belt furnace;

wherein evaluation logic is set in the evaluation device, and the evaluation device evaluates the overall quality of the output products in the mesh belt furnace based on the evaluation logic; a number of groups of sintering equipment are uniformly arranged in the sintering station of the processing station of the mesh belt furnace; and when the regulation and control device performs temperature regulation and control on sintering equipment, if $T_{center}$ of sub-images of a product image corresponding to a region on the sintering equipment with respect to a product surface position is greater than $T_{MAX}$, a temperature of the sintering equipment is regulated downwards to be not lower than $T_{MIN}$, and if $T_{center}$ is smaller than $T_{MIN}$, the temperature of the sintering equipment is regulated upwards to be not higher than $T_{MAX}$.

Further, the evaluation logic set in the evaluation device is expressed as:

$$K = \frac{\sum_{q=1}^{p}(zk_q)}{g} \times \overline{\sum_{r=1}^{w}d(s_r, s_{r+1})},$$

where k is a performance value of an overall quality evaluation result of the output products in the mesh belt furnace; p is a set of product images involved in qualification determination; $zk_q$ is a defined value of a qualification determination result k for a product corresponding to the qth group of product images; g is a total number of product images; w is a set of product images corresponding to products with a determination result of being unqualified; and $d(s_r,s_{r+1})$ is a distance between the rth group of product images and the (r+1)th group of product images, wherein $$\overline{\sum_{r=1}^{w}d(s_r, s_{r+1})}$$

represents averaging of $$\sum_{r=1}^{w}d(s_r, s_{r+1});$$

a larger K wherein indicates better overall quality of the output products in the mesh belt furnace, and vice versa, a smaller K indicates worse overall quality of the output products in the mesh belt furnace; $zk_q$ takes a value of 1 or 0, specifically: if the qualification determination result k for the product corresponding to the product images is qualified, the value of $zk_q$ is 1; otherwise, the value is 0.

Further, the analysis device is interactively connected to the identification device and the positioning device via a wireless network; the analysis device is interactively connected to a storage device via the wireless network; the storage device is interactively connected to a segmentation device and a camera device via the wireless network; the positioning device is interactively connected to an evaluation device via the wireless network; and the evaluation device is interactively connected to a regulation and control device via the wireless network.

In a second aspect, a status control method for a mesh belt furnace for ceramic sintering includes the following steps:

step 1: acquiring product image data in a sintering zone in a processing station of a mesh belt furnace;

step 2: setting product image data segmentation logic, and performing segmentation on the product image data based on the product image data segmentation logic to extract all product images in the product image data;

step 3: acquiring the product images obtained by segmentation and extraction, setting product sintering status analysis logic, analyzing a sintering status of each group of product images, and identifying a product corresponding to unqualified product images;

step 4: localizing the product corresponding to each group of unqualified product images on the mesh belt furnace, and evaluating quality of output sintered products in the mesh belt furnace by combining a localization result and an identification result of the product corresponding to the unqualified product images;

step 5: setting regulation and control logic, acquiring analysis and identification results of whether products corresponding to the product images are qualified, and localizing products corresponding to unqualified product images; and step 6: for the localized products corresponding to unqualified product images, deploying sintering equipment in the corresponding sintering zone of the processing station, and performing temperature regulation and control on the sintering equipment based on the regulation and control logic.

Compared with known prior art, the technical solutions provided in the present disclosure have the following beneficial effects.

The present disclosure provides a mesh belt furnace for ceramic sintering status monitoring system; during operation of the system, image data acquisition on sintered products in the mesh belt furnace allows primary data to be provided for monitoring an operation status of the mesh belt furnace; then analysis based on the acquired product image data allows to determine qualification of output products in the mesh belt furnace and evaluate overall quality thereof; further, a determination and evaluation result is used to determine whether the operation status of the mesh belt furnace is normal; in the case of an abnormal operation status of the mesh belt furnace, a station and a position with abnormality can be precisely localized, thus effectively improving the safety and stability of the operation of the mesh belt furnace, and ensuring higher quality of products output during operation of the mesh belt furnace.

BRIEF DESCRIPTION OF THE DRAWINGS

To more clearly describe the technical solutions in the embodiments of the present disclosure or in the prior art, a brief introduction to the drawings for use in description of the embodiments or the prior art will be given below. Obviously, the drawings described below only represent some embodiments of the present disclosure, and those of ordinary skill in the art can obtain other drawings according to these drawings without creative efforts.

Reference signs in the drawings: 1, sintered product; 2, conveying station surface; 3, product image data; 4, product image.

DETAILED DESCRIPTION OF THE EMBODIMENTS

To make the objects, technical solutions and advantages of the embodiments of the present disclosure more apparent, the technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

The present disclosure will be further described in conjunction with embodiments.

Embodiment 1

Figure 1:
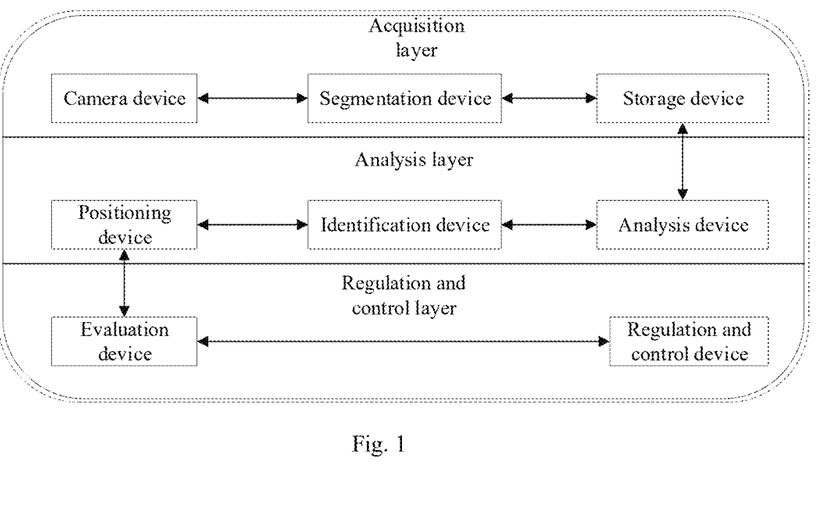
FIG. 1 is a structural diagram of a status monitoring system for a mesh belt furnace for ceramic sintering.

A status monitoring system for a mesh belt furnace for ceramic sintering in this embodiment, as shown in FIG. 1, includes: an acquisition layer, an analysis layer and a regulation and control layer;

image data of products conveyed in the mesh belt furnace is acquired by the acquisition layer, and acquired product image data is further segmented to obtain product images; and the analysis layer synchronously receives the product images obtained by segmentation in the acquisition layer, analyzes a product sintering status corresponding to each group of product images based on the product images, and applies the analyzed product sintering status corresponding to each group of product images, to identify a product corresponding to product images with unqualified sintering, and further obtain a corresponding position of the product corresponding to the product images with unqualified sintering in the mesh belt furnace;

the acquisition layer includes a camera device, a segmentation device and a storage device; the camera device is configured to acquire the image data of the products conveyed in the mesh belt furnace; the segmentation device is configured to receive the image data of the products acquired by the camera device and perform segmentation on the image data of the products to extract all product images in the image data of the products; and the storage device is configured to receive the product images extracted by segmentation by the segmentation device and store the product images;

wherein the mesh belt furnace is composed of a conveying station and a processing station; the conveying station is configured to convey products to the processing station so that the products are processed by the processing station; the processing station is composed of a pre-sintering zone, a sintering zone and a cooling zone, wherein the pre-sintering zone and the sintering zone are configured to provide a temperature for sintering the products, and the cooling zone is configured to cool the sintered products; the camera device is deployed in the sintering zone in the processing station; the conveying station in the mesh belt furnace conveys the products at a uniform speed, so that the products pass through the pre-sintering zone, the sintering zone and the cooling zone in the processing station successively; and the camera device operates continuously to acquire the image data of the products based on times when the products conveyed by the conveying station arrive at the sintering zone in the processing station;

the regulation and control layer receives an analysis result of the product sintering status corresponding to each group of product images from the analysis layer and the corresponding position of the product corresponding to the product images with unqualified sintering in the mesh belt furnace, evaluates overall quality of currently output products in the mesh belt furnace based on the analysis result, and performs regulation and control on the mesh belt furnace based on the received position in the mesh belt furnace;

the analysis layer includes an analysis device, an identification device and a positioning device, wherein the analysis device is configured to receive the product images obtained in the acquisition layer, and analyze product sintering statuses based on the product images; the identification device is configured to acquire an analysis result of the product sintering statuses from the analysis device, and identify an unqualified sintered product and product images corresponding thereto based on the analysis result of the product sintering statuses; and the positioning device is configured to receive the unqualified sintered product and the product images corresponding thereto identified by the identification device, and apply the product images corresponding to the unqualified sintered product to localize the product;

analysis logic of a product sintering status in the analysis device is expressed as:

$$\left\{ \begin{array}{l} k = \left(1 - \overline{\sum_{v=1}^{u} \text{sim}(\alpha_v, \alpha_{center})}\right) \times \sum_{v=1}^{n} \sum_{q=1}^{v} |T_q - T_{center}| \quad (1) \\ T_{center} \in (T_{MIN}, T_{MAX}) \quad (2) \end{array} \right.$$

where k is a product sintering status performance value; u represents a product image; sim $(a_v, a_{center})$ is a similarity based on a color aspect between the vth group of sub-images of the product image and a center region of the product image; $T_q$ is a corresponding value of the qth pixel in the vth group of sub-images of the product image, in a temperature mapping table; $T_{center}$ is a corresponding value of a center pixel in the vth group of sub-images of the product image, in the temperature mapping table; and $(T_{MIN}, T_{MAX})$ is a threshold composed of maximum and minimum values of a temperature required for ceramic sintering, wherein a smaller product sintering status performance value k indicates a better product sintering status, and vice versa, a larger product sintering status performance value k indicates a worse product sintering status; the temperature mapping table is set based on colors presented by sintered ceramic at different temperature states during a historical ceramic sintering process in the mesh belt furnace; sub-images of the product image are obtained by segmentation of the product image, resulting in no fewer than nine groups of sub-images of the product image, with the size of each group of sub-images of the product image being equal; and $$\overline{\sum_{v=1}^{u} \text{sim}(\alpha_v, \alpha_{center})}$$

represents averaging of $$\sum_{v=1}^{u} \text{sim}(\alpha_v, \alpha_{center});$$

the regulation and control layer includes an evaluation device and a regulation and control device; the evaluation device is configured to receive the unqualified sintered product localized by the analysis layer, and evaluate the overall quality of the output products in the mesh belt furnace, based on the unqualified sintered product; and the regulation and control device is configured to acquire position information of the product images corresponding to the unqualified sintered product, and perform temperature regulation and control on sintering equipment in a region corresponding to the position information of the product images, in a sintering station of a processing station of the mesh belt furnace;

wherein evaluation logic is set in the evaluation device, and the evaluation device evaluates the overall quality of the output products in the mesh belt furnace based on the evaluation logic; a number of groups of sintering equipment are uniformly arranged in the sintering station of the processing station of the mesh belt furnace; and when the regulation and control device performs temperature regulation and control on sintering equipment, if $T_{center}$ of sub-images of a product image corresponding to a region on the sintering equipment with respect to a product surface position is greater than $T_{MAX}$, a temperature of the sintering equipment is regulated downwards to be not lower than $T_{MIN}$, and if $T_{center}$ is smaller than $T_{MIN}$, the temperature of the sintering equipment is regulated upwards to be not higher than $T_{MAX}$;

the analysis device is interactively connected to the identification device and the positioning device via a wireless network; the analysis device is interactively connected to a storage device via the wireless network; the storage device is interactively connected to a segmentation device and a camera device via the wireless network; the positioning device is interactively connected to an evaluation device via the wireless network; and the evaluation device is interactively connected to a regulation and control device via the wireless network.

In this embodiment, during an operation stage of the system, the camera device operates to acquire image data of products conveyed in the mesh belt furnace; the segmentation device synchronously receives the image data of the products acquired by the camera device, and performs segmentation on the image data of the products to extract all product images in the image data of the products; the storage device receives in real time the product images extracted by segmentation by the segmentation device and stores the product images; the analysis device further receives the product images obtained in the acquisition layer, and analyzes product sintering statuses based on the product images; then, the identification device acquires an analysis result of the product sintering statuses from the analysis device, and identifies an unqualified sintered product, and product images corresponding thereto, based on the analysis result of the product sintering statuses; the positioning device receives at the same time the unqualified sintered product and the product images corresponding thereto identified by the identification device, and applies the product images corresponding to the unqualified sintered product to localize the product; finally, the evaluation device receives the unqualified sintered product localized by the analysis layer, and evaluates the overall quality of the output products in the mesh belt furnace, based on the unqualified sintered product; and the regulation and control device acquires position information of the product images corresponding to the unqualified sintered product, and performs temperature regulation and control on sintering equipment in a region corresponding to the position information of the product images, in a sintering station of a processing station of the mesh belt furnace.

The system in the above embodiment achieves more reliable safety monitoring for an operation status of a mesh belt furnace for ceramic sintering, and ensures long-term stable operation of the mesh belt furnace and the quality of output products in the mesh belt furnace.

Figure 3:
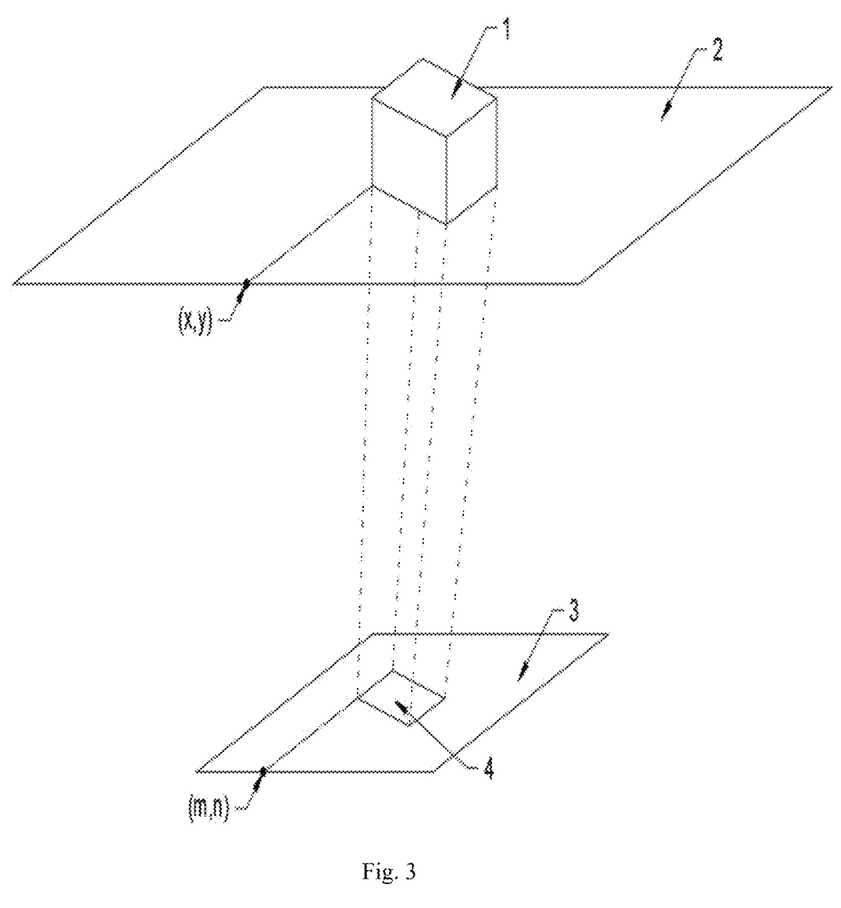
FIG. 3 is a conceptual diagram of a logic for determining product image coordinates in product image data in the present disclosure.

Referring to FIG. 3, it further illustrates, in conjunction with reference signs in the figure, how to determine product image coordinates from the product image data, and thereby extract product images.

Figure 4:
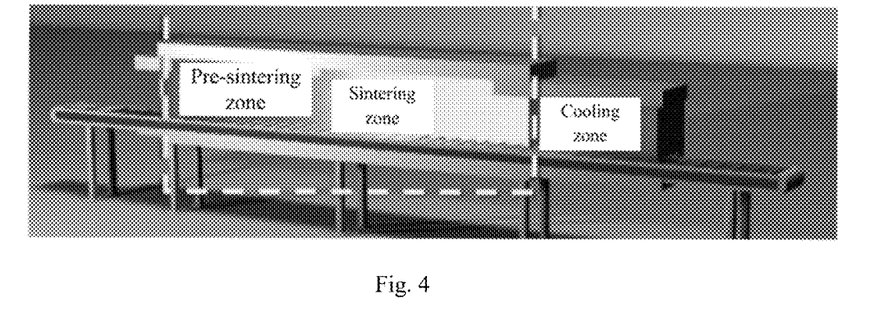
FIG. 4 is a schematic diagram illustrating a station of a mesh belt furnace in the present disclosure.

As shown in FIG. 4, it illustrates structural distribution of the mesh belt furnace referred to in the above embodiment.

Embodiment 2

In terms of specific implementation, on the basis of Embodiment 1, a status monitoring system for a mesh belt furnace for ceramic sintering in Embodiment 1 is described further specifically in this embodiment with reference to FIG. 1.

Each time before the products are conveyed by the conveying station of the mesh belt furnace, groups of products are placed at specified positions on a surface of the conveying station of the mesh belt furnace in such a manner that the groups of products are arranged in the same pose, and horizontal and longitudinal distances between the groups of products are equal; when the camera device acquires the product image data, a boundary of the conveying station of the mesh belt furnace is used as an image data acquisition boundary, so that foregrounds in the acquired product image data are entirely products and backgrounds therein are entirely the surface of the conveying station; and when receiving the product image data and segmenting the product image data to extract all product images in the product image data, the segmentation device first determines product image coordinates in the product image data so that closed graphs are formed based on the product image coordinates, and performs segmentation in the product image data by using the closed graphs to obtain image regions corresponding to the closed graphs.

By the above configuration, operation logic of the camera device is further defined, and a process of segmenting the product image data and extracting the product images is further defined logically for segmentation and extraction operations.

As shown in FIG. 1, logic for determining the product image coordinates in the product image data is expressed as:

$$\begin{cases} x/x_0 = m/m_0 & (1) \\ y/y_0 = n/n_0 & (2) \end{cases},$$

where (x,y) is any set of coordinates adjacent to a product on a conveying surface boundary of the conveying station of the mesh belt furnace; $(x_0,y_0)$ is any set of coordinates on a contour of a contact surface between the product conveyed on the conveying station of the mesh belt furnace and the conveying station; (m,n) is any set of coordinates on a long side of a contour of the product image data; and $(m_0,n_0)$ is product image coordinates, wherein (x,y) and $(x_0,y_0)$ use the same coordinate ratio, and horizontal and vertical coordinates of (x,y) and $(x_0,y_0)$ are greater than zero; (m,n) and $(m_0,n_0)$ use the same coordinate ratio, and horizontal and vertical coordinates of (m,n) and $(m_0,n_0)$ are greater than zero; (x,y) is selected in such a way that (x,y) falls on a long edge of the conveying surface of the conveying station, and a corresponding position of (x,y) is in the product image data; and a slope of (x,y) relative to $(x_0,y_0)$ is equal to a slope of (m,n) relative to $(m_0,n_0)$;

$(x_0,y_0)$ applied in the logic for determining the product image coordinates represents all corner points on the contour, and a number of groups of closed graphs are obtained by interconnecting adjacent coordinates of all product image coordinates in the product image data, and image regions corresponding to the groups of closed graphs are product images.

By the above configuration, specified determination logic is provided for the product image coordinates in the product image data.

As shown in FIG. 1, sub-images in each group of product images correspond to a group of $T_{center}$, and if all $T_{center}$ satisfies formula (2) and the product sintering status performance value k is smaller than 1, the product corresponding to the product graphs is determined to be qualified; otherwise, the product is determined to be unqualified; and after receiving the unqualified sintered product and the product images corresponding thereto, the positioning device further acquires closed graphs corresponding to the product images, and then using position coordinates corresponding to the closed graphs, reversely acquires $(x_0,y_0)$ corresponding to the position coordinates corresponding to the closed graphs based on the logic for determining the product image coordinates, and determines an unqualified sintered product based on $(x_0,y_0)$.

By the above configuration, qualification determination logic for the product corresponding to the product images used by the analysis layer of the system is further defined, and in this way, necessary operation data support is provided for the subsequent operation of the regulation and control layer of the system.

As shown in FIG. 1, the evaluation logic set in the evaluation device is expressed as:

$$K = \frac{\sum_{q=1}^{p}(zk_q)}{g} \times \overline{\sum_{r=1}^{w} d(s_r, s_{r+1})},$$

where K is a performance value of an overall quality evaluation result of the output products in the mesh belt furnace; p is a set of product images involved in qualification determination; $zk_q$ is a defined value of a qualification determination result k for a product corresponding to the qth group of product images; g is a total number of product images; w is a set of product images corresponding to products with a determination result of being unqualified; and $d(s_r,s_{r+1})$ is a distance between the rth group of product images and the (r+1)th group of product images, wherein $$\overline{\sum_{r=1}^{w} d(s_r, s_{r+1})}$$

represents averaging of $$\sum_{r=1}^{w} d(s_r, s_{r+1});$$

a larger K indicates better overall quality of the output products in the mesh belt furnace, and vice versa, a smaller K indicates worse overall quality of the output products in the mesh belt furnace; $zk_q$ takes a value of 1 or 0, specifically: if the qualification determination result k for the product corresponding to the product images is qualified, the value of $zk_q$ is 1; otherwise, the value is 0.

By the setting of the logical formula described above, the logic for evaluating the overall quality of the output products in the mesh belt furnace used by the evaluation device in the system is further defined.

Embodiment 3

Figure 2:
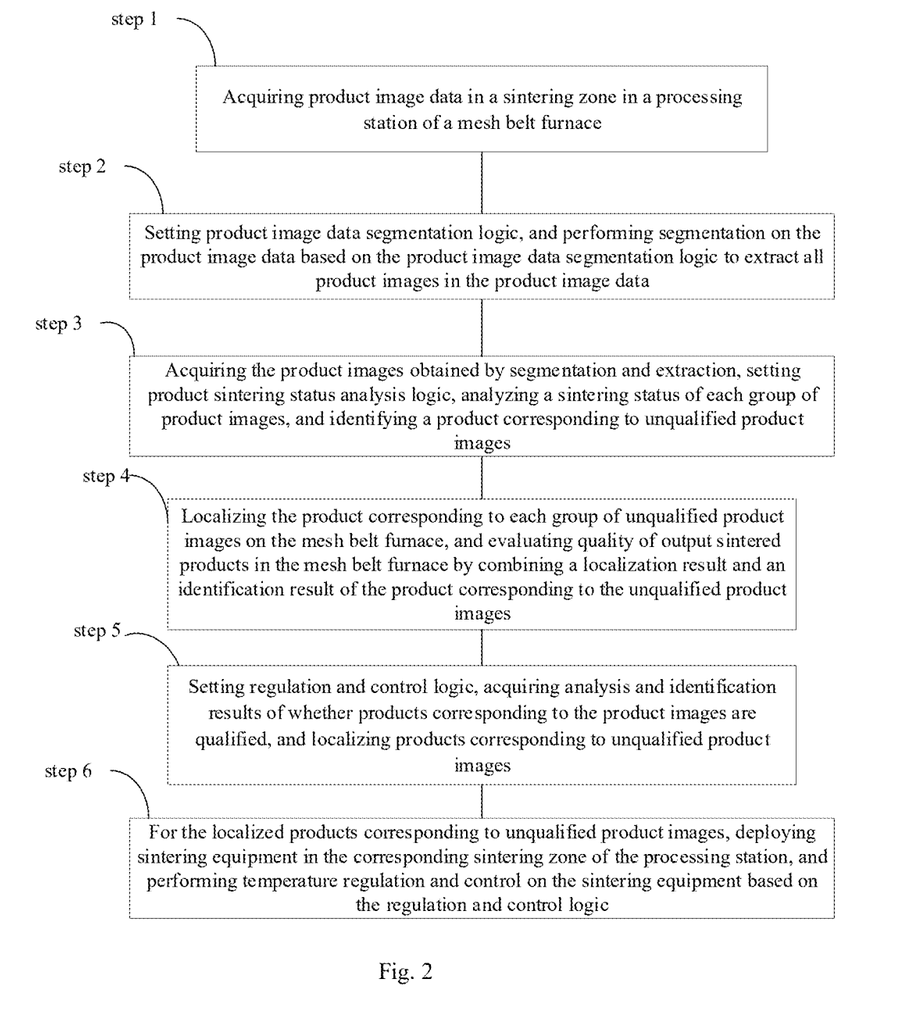
FIG. 2 is a flow diagram of a status control method for a mesh belt furnace for ceramic sintering.

In terms of specific implementation, on the basis of Embodiment 1, a status monitoring system for a mesh belt furnace for ceramic sintering in Embodiment 1 is described further specifically in this embodiment with reference to FIG. 2.

A status control method for a mesh belt furnace for ceramic sintering includes the following steps:

step 1: acquiring product image data in a sintering zone in a processing station of a mesh belt furnace;

step 2: setting product image data segmentation logic, and performing segmentation on the product image data based on the product image data segmentation logic to extract all product images in the product image data;

step 3: acquiring the product images obtained by segmentation and extraction, setting product sintering status analysis logic, analyzing a sintering status of each group of product images, and identifying a product corresponding to unqualified product images;

step 4: localizing the product corresponding to each group of unqualified product images on the mesh belt furnace, and evaluating quality of output sintered products in the mesh belt furnace by combining a localization result and an identification result of the product corresponding to the unqualified product images;

step 5: setting regulation and control logic, acquiring analysis and identification results of whether products corresponding to the product images are qualified, and localizing products corresponding to unqualified product images; and step 6: for the localized products corresponding to unqualified product images, deploying sintering equipment in the corresponding sintering zone of the processing station, and performing temperature regulation and control on the sintering equipment based on the regulation and control logic.

In summary, during operation of the system in the above embodiment, image data acquisition on sintered products in the mesh belt furnace allows primary data to be provided for monitoring an operation status of the mesh belt furnace; then analysis based on the acquired product image data allows to determine qualification of output products in the mesh belt furnace and evaluate overall quality thereof; further, a determination and evaluation result is used to determine whether the operation status of the mesh belt furnace is normal; in the case of an abnormal operation status of the mesh belt furnace, a station and a position with abnormality can be precisely localized, thus effectively improving the safety and stability of the operation of the mesh belt furnace, and ensuring higher quality of products output during operation of the mesh belt furnace.

The above embodiments are only used for illustrating rather than limiting the technical solutions of the present disclosure. Although the present disclosure is described in detail with reference to the foregoing embodiments, those of ordinary skill in the art should understand that they still can make modifications to the technical solutions disclosed in the foregoing embodiments or make equivalent substitutions to part of technical features thereof, With such modifications or substitutions, the essence of the corresponding technical solutions should not depart from the spirit and scope of the technical solutions of the embodiments of the present disclosure.

What is claimed is:

1. A status monitoring system for a mesh belt furnace for ceramic sintering, wherein the system comprises an acquisition layer, an analysis layer and a regulation and control layer;

image data of products conveyed in the mesh belt furnace is acquired by the acquisition layer, and acquired product image data is further segmented to obtain product images; and the analysis layer synchronously receives the product images obtained by segmentation in the acquisition layer, analyzes a product sintering status corresponding to each group of product images based on the product images, and applies the analyzed product sintering status corresponding to each group of product images, to identify a product corresponding to product images with unqualified sintering, and further obtain a corresponding position of the product corresponding to the product images with unqualified sintering in the mesh belt furnace;

the regulation and control layer receives an analysis result of the product sintering status corresponding to each group of product images from the analysis layer and the corresponding position of the product corresponding to the product images with unqualified sintering in the mesh belt furnace, evaluates overall quality of currently output products in the mesh belt furnace based on the analysis result, and performs regulation and control on the mesh belt furnace based on the received position in the mesh belt furnace;

the analysis layer comprises an analysis device, an identification device and a positioning device, wherein the analysis device is configured to receive the product images obtained in the acquisition layer, and analyze product sintering statuses based on the product images; the identification device is configured to acquire an analysis result of the product sintering statuses from the analysis device, and identify an unqualified sintered product and product images corresponding thereto based on the analysis result of the product sintering statuses; and the positioning device is configured to receive the unqualified sintered product and the product images corresponding thereto identified by the identification device, and apply the product images corresponding to the unqualified sintered product to localize the product;

analysis logic of a product sintering status in the analysis device is expressed as:

$$\left\{ \begin{array}{l} k = \left(1 - \overline{\sum_{v=1}^{n} \text{sim}(\alpha_v, \alpha_{center})}\right) \times \sum_{v=1}^{u} \sum_{q=1}^{v} |T_q - T_{center}| \quad (1) \\ T_{center} \in (T_{MIN}, T_{MAX}) \quad (2) \end{array} \right.$$

where k is a product sintering status performance value; u represents a product image; sim $(a_v, a_{center})$ is a similarity based on a color aspect between the vth group of sub-images of the product image and a center region of the product image; $T_q$ is a corresponding value of the qth pixel in the vth group of sub-images of the product image, in a temperature mapping table; $T_{center}$ is a corresponding value of a center pixel in the vth group of sub-images of the product image, in the temperature mapping table; and $(T_{MIN}, T_{MAX})$ is a threshold composed of maximum and minimum values of a temperature required for ceramic sintering; and wherein a smaller product sintering status performance value k indicates a better product sintering status, and vice versa, a larger product sintering status performance value k indicates a worse product sintering status; the temperature mapping table is set based on colors presented by sintered ceramic at different temperature states during a historical ceramic sintering process in the mesh belt furnace; sub-images of the product image are obtained by segmentation of the product image, resulting in no fewer than nine groups of sub-images of the product image, with the size of each group of sub-images of the product image being equal; and $$\overline{\sum_{v=1}^{u} \text{sim}(\alpha_v, \alpha_{center})}$$

represents averaging of $$\sum_{v=1}^{u} \text{sim}(\alpha_v, \alpha_{center}).$$

2. The status monitoring system for the mesh belt furnace for ceramic sintering according to claim 1, wherein the acquisition layer comprises a camera device, a segmentation device and a storage device; the camera device is configured to acquire the image data of the products conveyed in the mesh belt furnace; the segmentation device is configured to receive the image data of the products acquired by the camera device and perform segmentation on the image data of the products to extract all product images in the image data of the products; and the storage device is configured to receive the product images extracted by segmentation by the segmentation device and store the product images; and wherein the mesh belt furnace is composed of a conveying station and a processing station; the conveying station is configured to convey products to the processing station so that the products are processed by the processing station; the processing station is composed of a pre-sintering zone, a sintering zone and a cooling zone, wherein the pre-sintering zone and the sintering zone are configured to provide a temperature for sintering the products, and the cooling zone is configured to cool the sintered products; the camera device is deployed in the sintering zone in the processing station; the conveying station in the mesh belt furnace conveys the products at a uniform speed, so that the products pass through the pre-sintering zone, the sintering zone and the cooling zone in the processing station successively; and the camera device operates continuously to acquire the image data of the products based on times when the products conveyed by the conveying station arrive at the sintering zone in the processing station.

3. The status monitoring system for the mesh belt furnace for ceramic sintering according to claim 2, wherein each time before the products are conveyed by the conveying station of the mesh belt furnace, groups of products are placed at specified positions on a surface of the conveying station of the mesh belt furnace in such a manner that the groups of products are arranged in the same pose, and horizontal and longitudinal distances between the groups of products are equal; when the camera device acquires the product image data, a boundary of the conveying station of the mesh belt furnace is used as an image data acquisition boundary, so that foregrounds in the acquired product image data are entirely products and backgrounds therein are entirely the surface of the conveying station; and when receiving the product image data and segmenting the product image data to extract all product images in the product image data, the segmentation device first determines product image coordinates in the product image data so that closed graphs are formed based on the product image coordinates, and performs segmentation in the product image data by using the closed graphs to obtain image regions corresponding to the closed graphs.

4. The status monitoring system for the mesh belt furnace for ceramic sintering according to claim 3, wherein logic for determining the product image coordinates in the product image data is expressed as:

$$\begin{cases} x/x_0 = m/m_0 & (1) \\ y/y_0 = n/n_0 & (2) \end{cases},$$

where (x,y) is any set of coordinates adjacent to a product on a conveying surface boundary of the conveying station of the mesh belt furnace; $(x_0,y_0)$ is any set of coordinates on a contour of a contact surface between the product conveyed on the conveying station of the mesh belt furnace and the conveying station; (m,n) is any set of coordinates on a long side of a contour of the product image data; and $(m_0,n_0)$ is product image coordinates; and wherein (x,y) and $(x_0,y_0)$ use the same coordinate ratio, and horizontal and vertical coordinates of (x,y) and $(x_0,y_0)$ are greater than zero; (m,n) and $(m_0,n_0)$ use the same coordinate ratio, and horizontal and vertical coordinates of (m,n) and $(m_0,n_0)$ are greater than zero; (x,y) is selected in such a way that (x,y) falls on a long edge of the conveying surface of the conveying station, and a corresponding position of (x,y) is in the product image data; and a slope of (x,y) relative to $(x_0,y_0)$ is equal to a slope of (m,n) relative to $(m_0,n_0)$.

5. The status monitoring system for the mesh belt furnace for ceramic sintering according to claim 4, wherein $(x_0,y_0)$ applied in the logic for determining the product image coordinates represents all corner points on the contour, and a number of groups of closed graphs are obtained by interconnecting adjacent coordinates of all product image coordinates in the product image data, and image regions corresponding to the groups of closed graphs are product images.

6. The status monitoring system for the mesh belt furnace for ceramic sintering according to claim 5, wherein sub-images in each group of product images correspond to a group of $T_{center}$, and if all $T_{center}$ satisfies formula (2) and the product sintering status performance value k is smaller than 1, the product corresponding to the product graphs is determined to be qualified; otherwise, the product is determined to be unqualified; and after receiving the unqualified sintered product and the product images corresponding thereto, the positioning device further acquires closed graphs corresponding to the product images, and then using position coordinates corresponding to the closed graphs, reversely acquires $(x_0,y_0)$ corresponding to the position coordinates corresponding to the closed graphs based on the logic for determining the product image coordinates, and determines an unqualified sintered product based on $(x_0,y_0)$.

7. The status monitoring system for the mesh belt furnace for ceramic sintering according to claim 1, wherein the regulation and control layer comprises an evaluation device and a regulation and control device; the evaluation device is configured to receive the unqualified sintered product localized by the analysis layer, and evaluate the overall quality of the output products in the mesh belt furnace, based on the unqualified sintered product; and the regulation and control device is configured to acquire position information of the product images corresponding to the unqualified sintered product, and perform temperature regulation and control on sintering equipment in a region corresponding to the position information of the product images, in a sintering station of a processing station of the mesh belt furnace; and wherein evaluation logic is set in the evaluation device, and the evaluation device evaluates the overall quality of the output products in the mesh belt furnace based on the evaluation logic; a number of groups of sintering equipment are uniformly arranged in the sintering station of the processing station of the mesh belt furnace; and when the regulation and control device performs temperature regulation and control on sintering equipment, if $T_{center}$ of sub-images of a product image corresponding to a region on the sintering equipment with respect to a product surface position is greater than $T_{MAX}$, a temperature of the sintering equipment is regulated downwards to be not lower than $T_{MIN}$, and if $T_{center}$ is smaller than $T_{MIN}$, the temperature of the sintering equipment is regulated upwards to be not higher than $T_{MAX}$.

8. The status monitoring system for the mesh belt furnace for ceramic sintering according to claim 7, wherein the evaluation logic set in the evaluation device is expressed as:

$$K = \frac{\sum_{q=1}^{p}(zk_q)}{g} \times \overline{\sum_{r=1}^{w}d(s_r, s_{r+1})},$$

where K is a performance value of an overall quality evaluation result of the output products in the mesh belt furnace; p is a set of product images involved in qualification determination; $zk_q$ is a defined value of a qualification determination result k for a product corresponding to the qth group of product images; g is a total number of product images; w is a set of product images corresponding to products with a determination result of being unqualified; and $d(s_r, s_{r+1})$ is a distance between the rth group of product images and the (r+1)th group of product images; and
wherein $$\overline{\sum_{r=1}^{w}d(s_r, s_{r+1})}$$

represents averaging of $$\sum_{r=1}^{w}d(s_r, s_{r+1});$$

a larger K indicates better overall quality of the output products in the mesh belt furnace, and vice versa, a smaller K indicates worse overall quality of the output products in the mesh belt furnace; $zk_q$ takes a value of 1 or 0, specifically: if the qualification determination result k for the product corresponding to the product images is qualified, the value of $zk_q$ is 1; otherwise, the value is 0.

9. The status monitoring system for the mesh belt furnace for ceramic sintering according to claim 1, wherein the analysis device is interactively connected to the identification device and the positioning device via a wireless network; the analysis device is interactively connected to a storage device via the wireless network; the storage device is interactively connected to a segmentation device and a camera device via the wireless network; the positioning device is interactively connected to an evaluation device via the wireless network; and the evaluation device is interactively connected to a regulation and control device via the wireless network.

* * * * *